US008856112B2

(12) United States Patent
Najork et al.

(10) Patent No.: US 8,856,112 B2
(45) Date of Patent: Oct. 7, 2014

(54) CONSIDERING DOCUMENT ENDORSEMENTS WHEN PROCESSING QUERIES

(75) Inventors: Marc A. Najork, Palo Alto, CA (US); Rina Panigrahy, San Ramon, CA (US); Rajesh K. Shenoy, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 103 days.

(21) Appl. No.: 13/218,450

(22) Filed: Aug. 26, 2011

(65) Prior Publication Data
US 2013/0054640 A1    Feb. 28, 2013

(51) Int. Cl.
*G06F 7/00* (2006.01)
*G06F 17/30* (2006.01)

(52) U.S. Cl.
CPC .... *G06F 17/30867* (2013.01); *G06F 17/30522* (2013.01)
USPC .......................................... 707/727; 707/732

(58) Field of Classification Search
CPC ..................... G06F 17/30522; G06F 17/30867
USPC ......................................... 707/737, 732, 727
See application file for complete search history.

(56) References Cited

U.S. PATENT DOCUMENTS

| 7,860,889 | B1 | 12/2010 | Martino et al. |
| 2007/0203887 | A1* | 8/2007 | Dynin ............................... 707/3 |
| 2009/0006388 | A1 | 1/2009 | Ives et al. |
| 2009/0228486 | A1* | 9/2009 | Kuehr-McLaren et al. ...... 707/9 |
| 2010/0082593 | A1 | 4/2010 | Singh |
| 2011/0035329 | A1 | 2/2011 | Delli Santi et al. |
| 2011/0087661 | A1 | 4/2011 | Quick et al. |

OTHER PUBLICATIONS

Horowitz, et al., "The Anatomy of a Large Scale Social Search Engine", Retrieved at <<http://vark.com/aardvarkFinalWWW2010.pdf>>, In Proceedings of the 19th international conference on World wide web, Apr. 26-30, 2010, pp. 10.
Ankolekar, et al., "Friendlee: A Mobile Application for Your Social Life", Retrieved at <<http://www.hpl.hp.com/research/idl/papers/friendlee/friendlee.pdf>>, Proceedings of the 11th International Conference on Human-Computer Interaction with Mobile Devices and Services, Sep. 15-18, 2009, pp. 4.
"Delver Presents: A Social Networks Search Engine", Retrieved at <<http://www.israel-on-blog.com/delver-presents-a-social-networks-search-engine/>>, Retrieved Date: Jun. 7, 2011, pp. 2.

* cited by examiner

*Primary Examiner* — Mariela Reyes
(74) *Attorney, Agent, or Firm* — Micah Goldsmith; Glen Johnson; Micky Minhas (57) ABSTRACT

User accounts in a social networking application are divided into highly-connected accounts and regular accounts. A mapping of the highly-connected accounts to their friends, and a mapping of accounts to documents endorsed by the users associated with the accounts are stored on index servers of a search engine. When a query is received by a front-end server of the search engine, the front-end server determines if an account associated with the query is a highly-connected account. If it is, only an identifier of the account is sent to the index servers with the query. If it is not, however, then identifiers of all of the accounts that are friends with the account are sent with the query. The index servers then determine the documents that are endorsed by the friends of the account, and consider the determined documents when selecting documents that are responsive to the query.

16 Claims, 6 Drawing Sheets

CONSIDERING DOCUMENT ENDORSEMENTS WHEN PROCESSING QUERIES

BACKGROUND

Users of social networking applications frequently share endorsements of one or more documents among their friends or followers in the social networking application. For example, depending on the social networking application used, a user may post a link to a webpage onto their wall for viewing by their friends, or may send a link to a webpage to their followers.

As may be appreciated, the set of documents that are endorsed by users that have a social networking relationship with the user in the social networking application (e.g., "friends") may be useful for fulfilling queries provided by the user to a search engine. The assumption is that a user will also like documents that were endorsed or liked by their friends. Thus, when determining the documents that are most relevant to a query provided by a user, the documents that are responsive to the query that have also been endorsed by friends of the user in the social networking application may be favored over documents that are merely responsive to the query.

While considering such document endorsements enhances a user's overall search experience, incorporating the endorsements into modern search engines can be difficult. Typically, modern search engines divide the corpus of documents that make up the Internet among many index servers. When a query is received, the query is provided to each index server which then determines the most relevant documents for the query based on their individual subset of the corpus. A selection of the relevant documents from each index server is provided to, and then ranked by, a front-end server. Because of the size and dynamic nature of the social networking application, it may be difficult and unwieldy to store the data needed to incorporate document endorsements from the social networking application at each index server.

SUMMARY

User accounts in a social networking application are divided into highly-connected accounts and regular accounts. A mapping of the highly-connected accounts to their friends, and a mapping of accounts to documents endorsed by the users associated with the accounts are stored on index servers of a search engine. When a query is received by a front-end server of the search engine, the front-end server determines if an account associated with the query is a highly-connected account. If so, an identifier of the account is sent to the index servers with the query. If the account is not a highly-connected account, however, then identifiers of all of the accounts that are friends with the account are sent with the query. The index servers then determine the documents that are endorsed by the friends of the account, and consider the determined documents when selecting documents that are responsive to the query.

In an implementation, a query is received at a front-end server. The query is associated with a user account in a social networking application. Whether the user account has a social networking relationship with more than a threshold number of other user accounts in the social networking application is determined by the front-end server. If it is determined that the user account has a social networking relationship with more than the threshold number of other user accounts, the received query and an identifier of the user account are provided by the front-end server to each of a plurality of index servers. Identifiers of one or more documents are received from each of the index servers by the front-end server. Each of the identified documents was selected by an index server based on the received query and one or more documents that were endorsed by one or more users that are associated with one or more of the other user accounts that have a social networking relationship with the user account.

In an implementation, a query and an identifier of a user account are received at an index server from a front-end server through a network. One or more documents endorsed by users associated with user accounts that have a social networking relationship with the identified user account are determined from a plurality of documents by the index server. One or more documents from the plurality of documents are selected by the index server based on the received query and the determined documents endorsed by users. Identifiers of the selected one or more documents are provided to the front-end server through the network by the index server.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
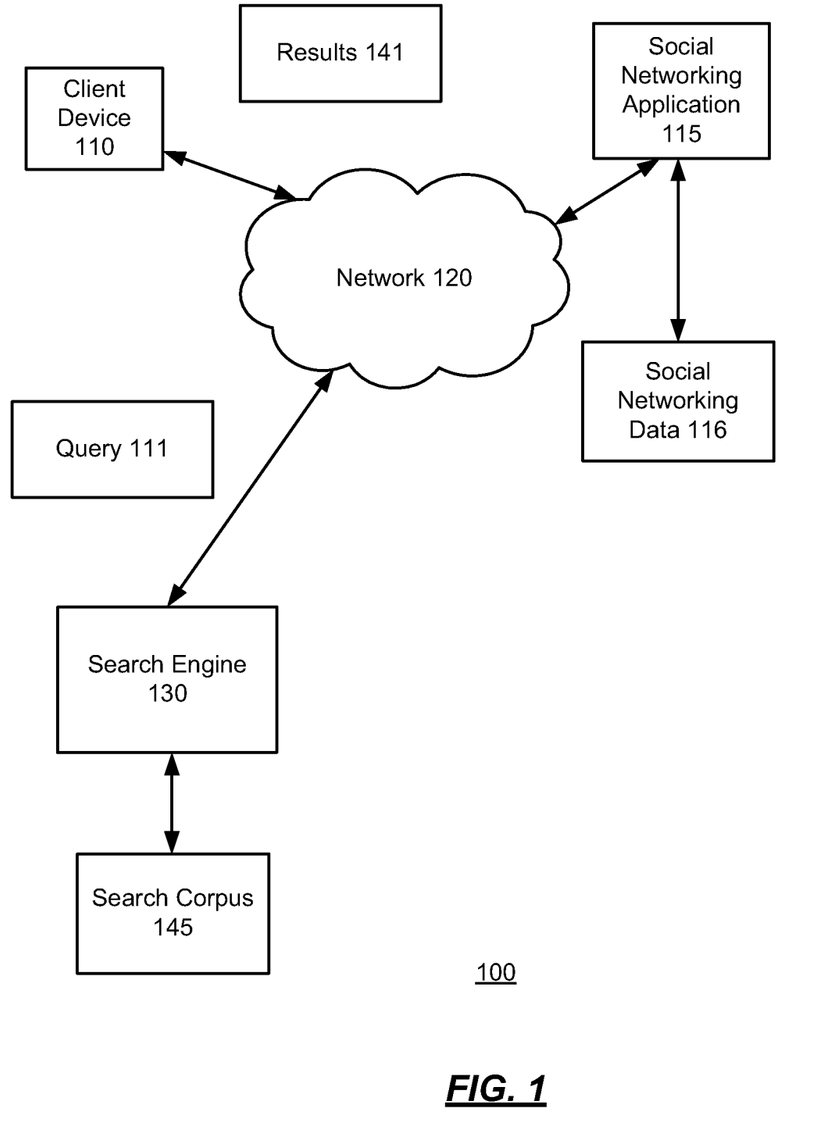
FIG. 1 is an illustration of an example environment for considering document endorsements from a social networking application by a search engine.

FIG. 1 is an illustration of an example environment 100 for considering document endorsements from a social networking application 115 by a search engine 130. The environment 100 may include a client device 110, the social networking application 115, and the search engine 130 in communication with one another through a network 120. The network 120 may be a variety of network types including the public switched telephone network (PSTN), a cellular telephone network, and a packet switched network (e.g., the Internet). Although shown as comprised within separate devices over the network 120, depending on the implementation, the client device 110, the search engine 130, and the social networking application 115 may be comprised within a single computing device, or one or more other computing devices that may or may not communicate over the network 120.

In some implementations, the client device 110 may include a desktop personal computer, workstation, laptop, PDA (personal digital assistant), smart phone, cell phone, or any WAP (wireless application protocol) enabled device or any other computing device capable of interfacing directly or indirectly with the network 120. A client device 110 may be implemented using a general purpose computing device such as the computing device 600 described with respect to FIG. 6, for example. While only one client device 110 is shown, it is for illustrative purposes only; multiple client devices may be supported.

The search engine 130 may be configured to receive queries, such as a query 111, from users using clients such as the client device 110. The search engine 130 may search for documents responsive to the query 111 by searching a search corpus 145 using the received query 111. The search corpus 145 may be an index of documents such as webpages, product descriptions, image data, video data, map data, etc. The search engine 130 may generate and return results 141 to the client device 110 based on the search corpus 145. The results 141 may comprise a webpage and may include links to some or all of the documents from the search corpus 145 that are responsive to the query 111.

The social networking application 115 may provide social networking functionality to users of client devices. In some implementations, each user may have a user account in the social networking application 115. The user may establish social networking relationships with one or more other user accounts of the social networking application 115. The social networking relationships may include a friend based relationship where the user and one or more other users are able to share messages, view profile information associated with one another, post public messages on walls associated with each other, and recommend or endorse documents, for example. Other well known social networking relationships may also be supported. The social networking application 115 may include a variety of well known social networking applications.

The social networking application 115 may store and/or access social networking data 116. In some implementations, the social networking data 116 may include an identifier of each user account, and identifiers of the various social networking relationships between the user accounts, as well as any documents endorsed by the users associated with each account. Endorsing a document may include a variety of actions specific to the social networking application 115 that tend to show that a user likes or approves of the document. For example, posting a link to a document to the social networking application, "liking" a document link provided by another user in the social networking application, or commenting on a document link provided by another user in the social networking application may all be considered endorsements of a document.

Figure 2:
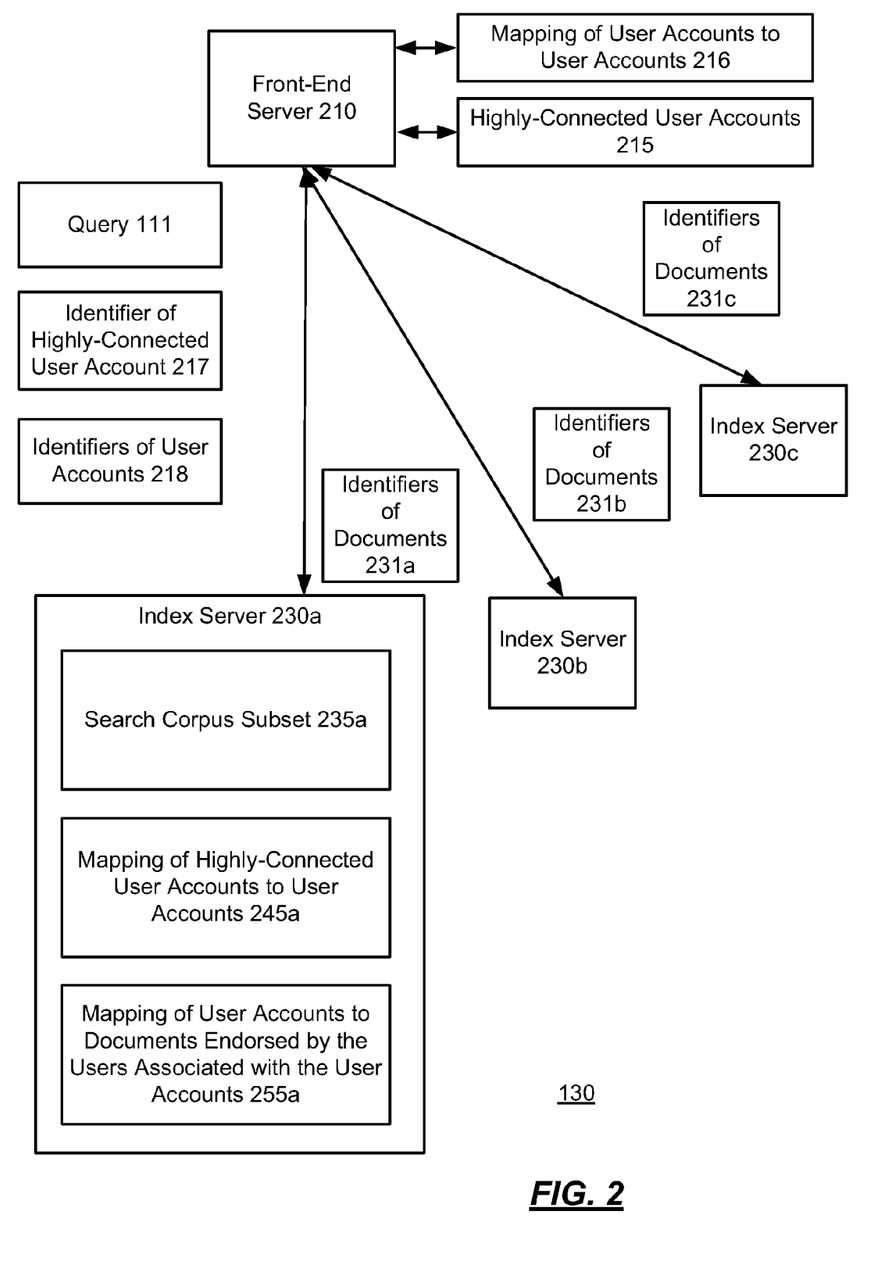
FIG. 2 is an illustration of an example search engine.
Figure 3:
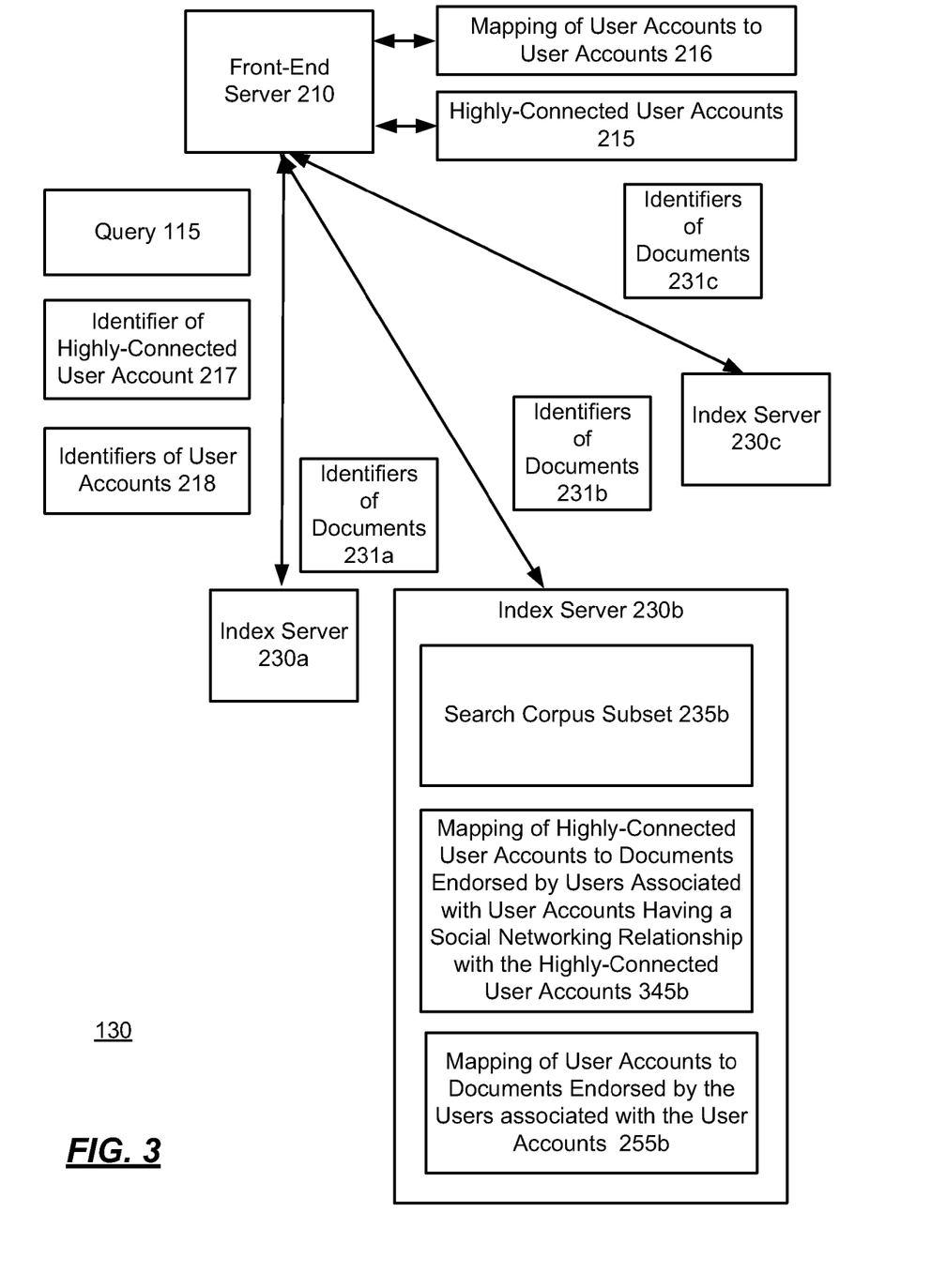
FIG. 3 is an illustration of another example search engine.

As described further with respect to FIGS. 2 and 3, the social networking application 115 may provide the social networking data 116 to the search engine 130, and the search engine 130 may consider some or all of the social networking data 116 when generating the results 141. In particular, the search engine 130 may consider the documents that are endorsed by users of the social networking application 115. In some implementations, the search engine 130 may receive a query 111 from a client device 110 along with an identifier of a user account in the social networking application 115 associated with a user of the client device 110. The search engine 130 may generate the results 141 based on the documents indexed in the search corpus 145 and one or more documents that are endorsed by users who have a social networking relationship with the user who provided the query.

FIG. 2 is an illustration of an example search engine 130. As illustrated, the search engine 130 includes a front-end server 210, and a plurality of index servers 230a, 230b, and 230c. More or fewer components may be supported by the search engine 130. The front-end server 210 and the index servers 230a-c may each be implemented using a general purpose computing device such as the computing device 600 described with respect to FIG. 6, for example. While only one front-end server 210 and three index servers 230a-c are shown, it is for illustrative purposes only; there is no limit to the number of front-end servers and index servers that may be supported.

In some implementations, the front-end server 210 may receive the query 111 from a user and may provide the query 111 to each of the index servers 230a-c. Each index server may maintain an index of a subset of the documents in the search corpus 145. For example, the index server 230a stores its subset of the corpus 145 as the search corpus subset 235a. For purposes of illustration, only the components of the index server 230a are shown in FIG. 2.

Each of the index servers 230a-c may determine one or more documents in their respective subset of the search corpus that are responsive to the query 111, and may provide identifiers of the responsive documents to the front-end server 210. The index server 230a may provide identifiers of documents 231a, the index server 230b may provide identifiers of documents 231b, and the index server 230c may provide identifiers of documents 231c. The front-end server 210 may receive the identifiers of documents and may provide a subset of the identifiers of documents to the client device 110 as the results 141. In some implementations, the results 141 may be provided in ranked order, for example.

In order to incorporate social networking data 116 into the selection of the results 141, in some implementations, the front-end server 210 may receive an identifier of a user account in the social networking application 115 along with a received query 111. The identifier may identify the user account of a user who provided the query 111. For example, the identifier of a user account may be provided by a browser associated with the client device 110. In order to ensure the privacy of the user, in some implementations, the identifier of the user account may only be provided to the front-end server 210 if the user opts in or otherwise consents to providing the identifier.

Before providing the query 111 to the index servers 230a-c, the front-end server 210 may determine if the identified user account associated with the query 111 is what is referred to herein as a "highly-connected user account". A user account is a highly-connected user account if it has a social networking relationship with more than a threshold number of other user accounts. A social networking relationship may be one of a variety of well known social networking relationships such as friend or follower, for example. The threshold number of social networking relationships may be set by a user or administrator. An example threshold number of social networking relationships may be 50, 75, or 100; however, other thresholds may be used.

In some implementations, the front-end server 210 may determine if an identified user account is a highly-connected user account if the user account is listed in a set of highly-connected user accounts such as highly-connected user accounts 215. In other implementations, the front-end server 210 may determine the number of social networking relationships that the identified user account has, and may compare the determined number with the threshold number to determine if the identified user account is a highly-connected user account. The social networking relationships among the user accounts in the social networking application 115 may be stored by the front-end server 210 as a mapping of user accounts to user accounts 216.

The data that front-end server 210 provides to the index servers 230*a-c* along with the query 111 may depend on whether or not the identified user account is a highly-connected user account. If the user account is a highly-connected user account, the front-end server 210 may provide an identifier of the highly-connected user account 217 to the index servers 230*a-c*. Otherwise, the front-end server 210 may provide identifiers of the user accounts 218 to the index servers 230*a-c*. The identifiers of user accounts 218 may be identifiers of the user accounts that the user account that is associated with the query 111 has a social networking relationship with.

In some implementations, the front-end server 210 may determine the identifiers of user accounts 218 using the mapping of user accounts to user accounts 216. The mapping 216 may represent the social networking relationships between user accounts 218, and may map each user account to the user accounts that it has a social networking relationship with. The mapping 216 may be periodically updated and provided to the front-end server 210 by the social networking application 115.

The index servers 230*a-c* may receive the query 111 from the front-end server 210 along with either the identifier of the highly-connected user account 217 or the identifiers of user accounts 218. An index server (e.g., the index server 230*a*) may then determine documents from an associated subset of the search corpus 145 that are responsive to the received query. For example, the index server 230*a* may identify documents from a search corpus subset 235*a* that include some or all of the terms that make up the query 111. Each index server 230*a-c* may further rank the responsive documents to determine the most responsive documents. Any of a variety of well known document ranking techniques may be used.

When ranking or selecting the most responsive documents, the index servers 230*a-c* may further refine the documents that are selected using either the identifier of a highly-connected user account 217 or the identifiers of user accounts 218. If the index server (e.g., the index server 230*a*) received an identifier of a highly-connected user account 217, then the index server 230*a* may use a mapping of highly-connected user accounts to user accounts 245*a* to determine the user accounts that the identified highly-connected user account has social networking relationships with. The mapping 245*a* may have been provided by the social networking application 115 and may represent the social networking relationships between the highly-connected users and the other users of the social networking application 115.

After determining the user accounts that the identified highly-connected user account has social networking relationships with, the index server 230*a* may determine one or more documents that were endorsed by the users associated with the determined user accounts. In some implementations, the index server 230*a* may make the determination using the identified user accounts, and a mapping of user accounts to documents endorsed by the users associated with the user accounts 255*a*. Where the index server 230*a* receives identifiers of user accounts 218 (i.e., where the user account associated with the query 111 is not a highly-connected user account), the index server 230*a* may determine the one or more endorsed documents using the identifiers of user accounts 218 and the mapping 255*a*.

After determining the one or more endorsed documents, each of the index servers 230*a-c* may select or rank the documents from their respective subset of the search corpus that were found to be responsive to the query 111 to take into account the one or more endorsed documents. For example, each index server 230*a-c* may increase a ranking or selection weight of a responsive document that is also part of the one or more endorsed documents. Identifiers of the selected responsive documents may be provided to the front-end server 210 by each index server 230*a-c* as the identifiers of documents 231*a-c*.

As may be appreciated, by distinguishing between highly-connected user accounts and regular user accounts in the social networking application 115, the search engine 130 is able to reduce both the overall amount of data that is provided to each of the index servers 230*a-c* for a query 111, and the overall amount of data that is stored by each of the index servers 230*a-c*. For highly-connected users, network costs are reduced by only sending an identifier of the highly-connected user account 217 to the index servers 230*a-c* rather than the potentially large set of identifiers of user accounts that have social networking relationships with the highly-connected user. By providing identifiers of the user accounts that have social networking relationships with non-highly-connected users to the index servers 230*a-c* (i.e., the identifiers of user accounts 218), storage costs for the index servers 230*a-c* are reduced because only the mapping of social networking relationships for the highly-connected users is stored on the index servers 230*a-c* (i.e., the mapping 245*a*).

FIG. 3 is an illustration of another example search engine 130. An alternative configuration for the index servers is shown with respect to the index server 230*b*. The index server 230*b* includes a search corpus 235*b* and a mapping 255*b* corresponding to the search corpus 235*a* and the mapping 255*a* of the index server 230*a* respectively, but the mapping of highly-connected user accounts to user accounts 245*a* has been replaced with a mapping of highly-connected user accounts to documents endorsed by users associated with user accounts having a social networking relationship with the highly-connected user accounts 345*b*. Thus, when an identifier of a highly-connected user account 217 is received, the one or more documents that are endorsed by users associated with user accounts that have social networking relationships with the highly-connected user account may be determined by the index server 230*b* using the mapping 345*b*, rather than a combination of the mappings 245*a* and 255*a* used by the index server 230*a*.

Figure 4:
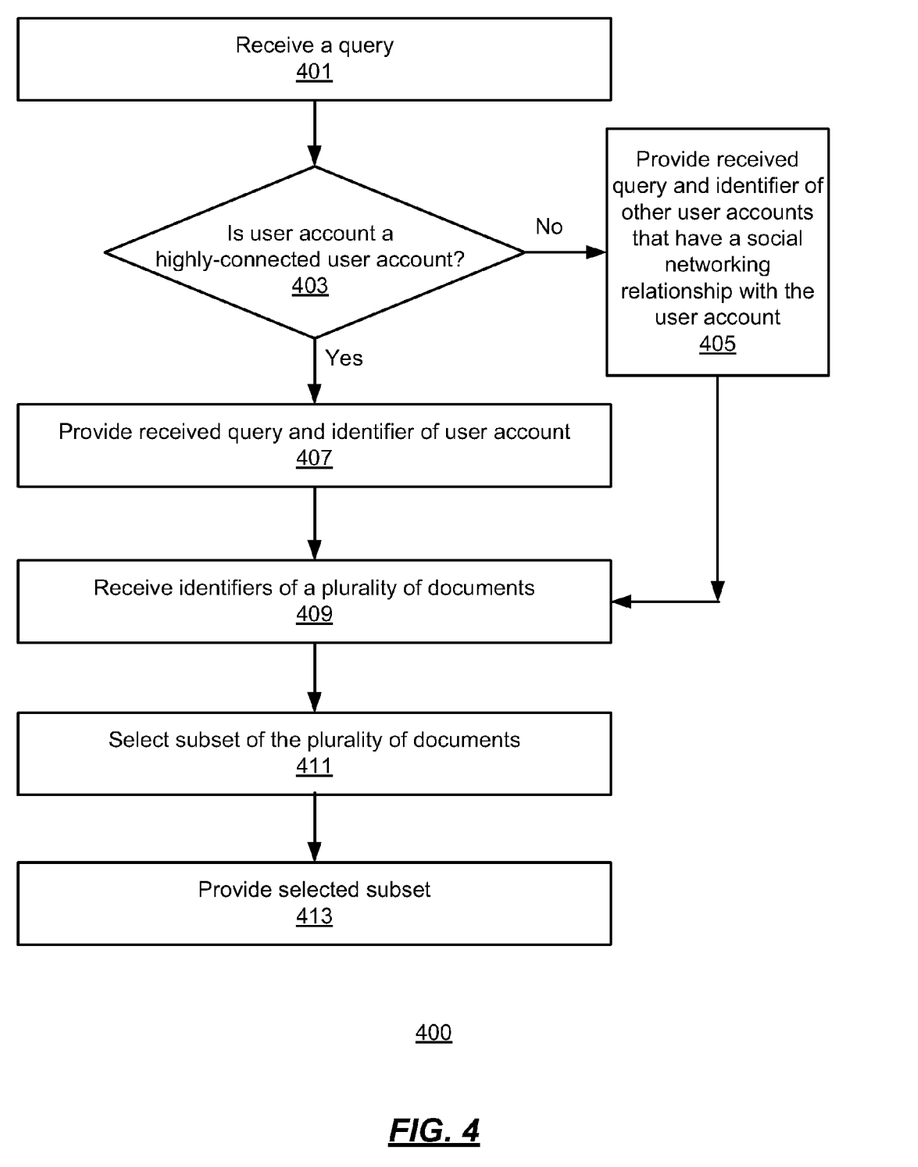
FIG. 4 is an operational flow of an implementation of a method for providing identifiers of documents in response to a received query by a front-end server.

FIG. 4 is an operational flow of an implementation of a method 400 for providing identifiers of documents in response to a query. The method 400 may be implemented by the front-end server 210 of the search engine 130, for example.

A query is received at 401. The query may be received by the front-end server 210 of the search engine 130 from a user at a client device 110. The query may be associated with a user account in a social networking application 115.

A determination is made as to whether the user account associated with the query is a highly-connected user account at 403. A user account may be considered a highly-connected user account if it has more than a threshold number of social networking relationships with other user accounts. An example of a social networking relationship is a friend relationship. The determination may be made by the front-end server 210 of the search engine 130. In some implementations, the determination may be made by determining if the user account is identified in the highly-connected user accounts 215. In other implementations, the determination may be made by determining the number of social networking relationships associated with the user account in the mapping of user accounts to user accounts 216. If the user account is a highly-connected user account, then the method 400 may continue at 407; otherwise, the method 400 may continue at 405.

The received query and identifiers of other user accounts that have a social networking relationship with the user account are provided at 405. The received query and identifiers may be provided by the front-end server 210 of the search engine 130 to one or more of the index servers 230*a-c*. The identifiers of other user accounts may be determined by the front-end server 210 using the mapping of user accounts to user accounts 216.

The received query and identifier of the user account are provided at 407. The received query and identifier of the user account may be provided by the front-end server 210 of the search engine 130 to one or more of the index servers 230*a-c*. Because the user account is a highly-connected user account, it may not be necessary for the front-end server 210 to provide identifiers of the other user accounts that the received user account has a social networking relationship with because that information is already stored on the index servers 230*a-c* (i.e., the mapping 245*a*).

Identifiers of a plurality of documents are received at 409. The identifiers may be received by the front-end server 210 from each of the index servers 230*a-c*. Where the user account was determined to be a highly-connected user account, the identified documents may have been selected by the index servers 230*a-c* by determining the user accounts that have a social networking relationship with the highly-connected user account, and determining the documents that were endorsed by users associated with the determined user accounts. The documents are then selected from the search corpus based on the received query and the determined one or more documents endorsed by the users that have social networking relationships with the highly-connected user account.

Where the received user account was determined to not be a highly-connected user account and the identifiers of the user accounts that have social networking relationships with the received user account were provided to the index servers 230*a-c*, the identified documents may have been selected by the index servers 230*a-c* by determining the documents that were endorsed by users associated with the identified user accounts. The documents are then selected from the search corpus based on the received query and the determined one or more documents endorsed by the users associated with the identified user accounts.

A subset of the plurality of identified documents is selected at 411. The subset of the identified documents may be selected by the front-end server 210. As described above, the front-end server 210 may receive identifiers of documents from each of the index servers 230*a-c* based on the unique subset of the corpus of documents that each of the index servers 230*a-c* stores. Because the number of identified documents may exceed the number of documents that the front-end server 210 may present to the user who provided the original query in the results 141, the front-end server may further rank the identified documents and select the most relevant identified documents to include in the results 141. Any of a variety of methods for ranking or selecting relevant documents may be used.

The selected subset of identified documents is provided at 413. The selected subset of identified documents may be provided by the front-end server 210 to the client device 110 of the user who provided the original query.

Figure 5:
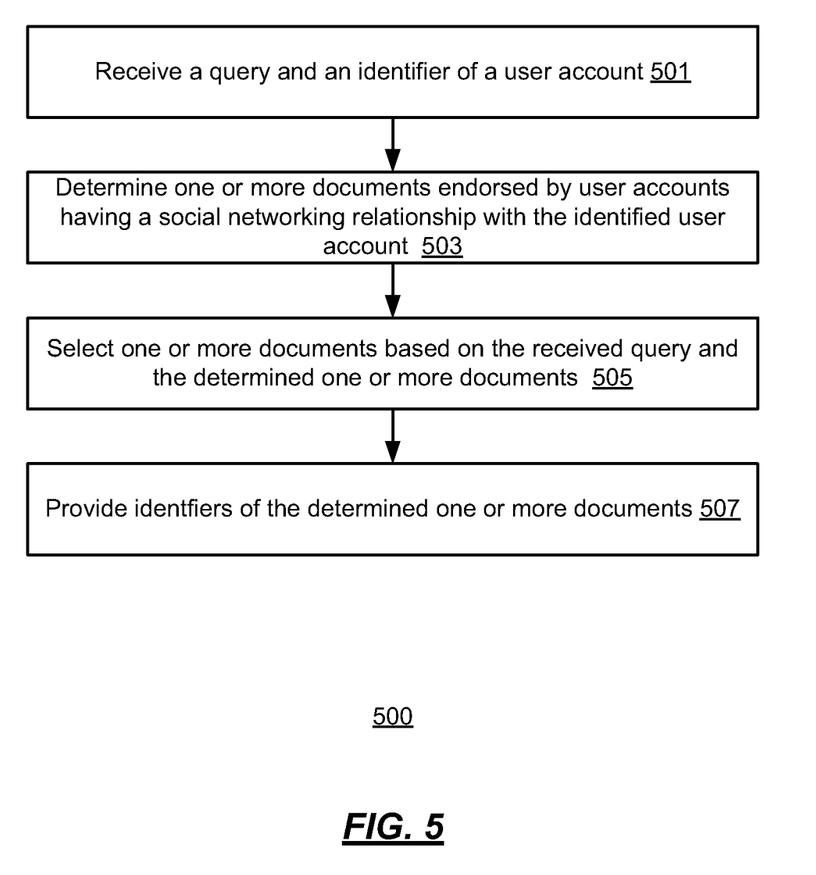
FIG. 5 is an operational flow of an implementation of a method for selecting identifiers of documents in response to a received query by an index server.

FIG. 5 is an operational flow of an implementation of a method 500 for selecting and providing documents in response to a received query. The method 500 may be implemented by one or more index servers 230*a-c* of the search engine 130.

A query and an identifier of a user account are received at 501. The query and the identifier of the user account may be received by one or more of the index servers 230*a-c* from the front-end server 210 of the search engine 130. The identified user account may be a highly-connected user account and may have more than a threshold number of social networking relationships with other user accounts in the social networking application 115.

One or more documents that are endorsed by users that have a social networking relationship with the identified user account are determined at 503. The document(s) may be determined by one or more of the index servers 230*a-c*. In some implementations, the one or more documents may be determined by determining the user accounts that have a social networking relationship with the identified user account, and determining the one or more documents that are endorsed by the determined users. The determinations may be made using the mappings 245*a* and 255*a*, for example. In other implementations the documents may be determined using a mapping of the highly-connected users to the documents that are endorsed by users associated with user accounts that the highly-connected users have social networking relationships with (i.e., the mapping 345*b*).

One or more documents are selected based on the received query and the determined one or more documents at 505. The one or more documents may be selected by one or more of the index servers 230*a-c*. In some implementations, the document(s) may be selected by first searching for documents in a search corpus subset stored by the particular index server that are responsive to the query. The documents that are responsive to the query are compared with the determined one or more endorsed documents to determine documents that are both responsive to the query and endorsed. The documents that are responsive to the query may be ranked, and the documents that are both responsive to the query and endorsed may be weighted higher or may receive a boost in their rankings. One or more documents may then be selected from the ranked documents.

Identifiers of the selected one or more documents are provided at 507. The identifiers may be provided by one or more of the index servers 230*a-c* to the front-end server 210. The front-end server 210 may then combine some or all of the identified one or more documents received from each of the index servers 230*a-c* into a results 141 that is provided to the client device 110 that originated the received query.

Figure 6:
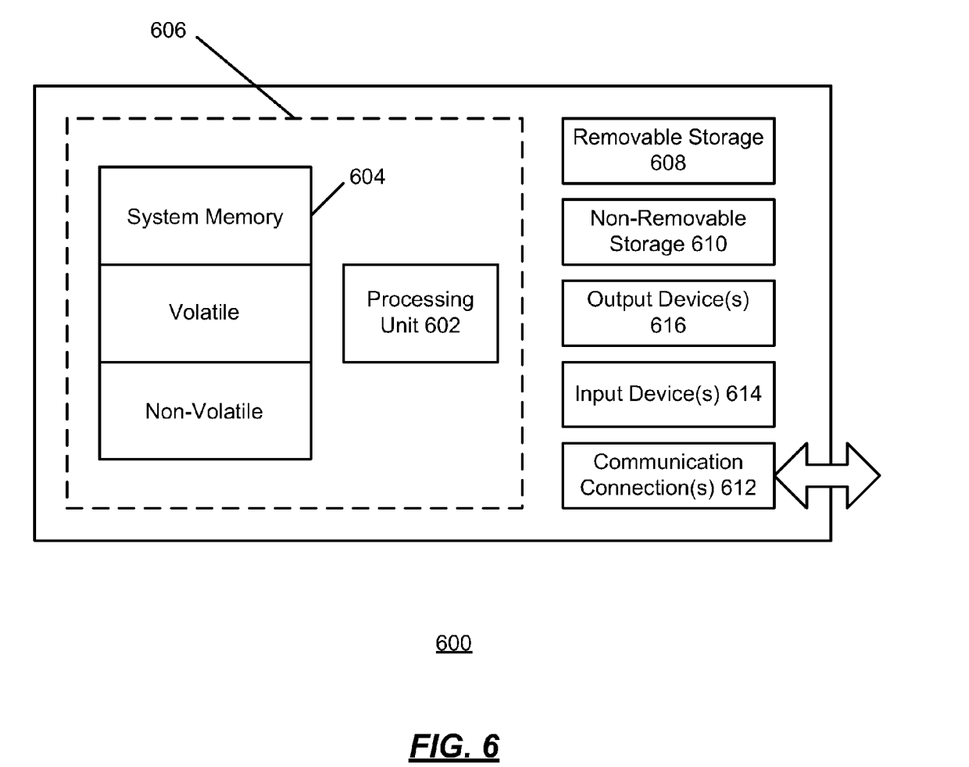
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:

receiving a query at a front-end server of a computing device, wherein the query is associated with a user account in a social networking application;

determining, by the front-end server, whether the user account has a social networking relationship with more than a threshold number of other user accounts in the social networking application;

if the user account has a social networking relationship with more than the threshold number of other user accounts, providing the received query and only an identifier of the user account to each of a plurality of index servers by the front-end server;

if the user account does not have a social networking relationship with more than the threshold number of other user accounts, providing the received query and identifiers of other user accounts that have a social networking relationship with the user account by the front-end server; and receiving, by the front-end server, identifiers of one or more documents from each of the plurality of index servers, wherein each of the identified one or more documents was selected by an index server based on the received query and one or more documents that were endorsed by one or more users that are associated with one or more of the other user accounts that have a social networking relationship with the user account, wherein each of the plurality of index servers stores a mapping of only each user account in the social networking application with more than the threshold number of social networking relationships to documents that were endorsed by users that are associated with user accounts that have a social networking relationship with the user accounts with more than the threshold number of social networking relationships.

2. The method of claim 1, further comprising selecting a subset of the identified one or more documents, and providing the selected subset to a user associated with the received query.

3. The method of claim 1, wherein each of the plurality of index servers indexes a unique subset of a corpus of documents.

4. The method of claim 3, wherein the documents in the corpus of documents comprise at least one of webpages, images, or videos.

5. The method of claim 3, wherein each of the plurality of index servers stores identifiers of the documents in their indexed subset of the corpus that were endorsed by one or more users that are associated with the user accounts in the social networking application.

6. The method of claim 1, wherein each of the plurality of index servers stores a mapping of user accounts in the social networking application to documents that were endorsed by users associated with the user accounts.

7. The method of claim 1, wherein the social networking relationship is a friend relationship.

8. A method comprising:
receiving a query and an identifier of a user account at an index server of a computing device from a front-end server through a network;
determining one or more documents endorsed by users associated with user accounts that have a social networking relationship with the identified user account from a plurality of documents by the index server;
selecting one or more documents from the plurality of documents based on the received query and the determined one or more documents endorsed by users by the index server; and
providing identifiers of the selected one or more documents to the front-end server by the index server through the network,
wherein the identified user account is a highly-connected user account, and
wherein determining one or more documents endorsed by users associated with user accounts that have a social networking relationship with the identified user account from the plurality of documents comprises:
retrieving a stored mapping of only highly-connected user accounts to documents that were endorsed by users that are associated with user accounts that have a social networking relationship with the highly-connected user accounts, wherein a user account is a highly-connected user account if it has a social networking relationship with more than a threshold number of other user accounts; and
determining the one or more documents from the plurality of documents endorsed by users associated with user accounts that have a social networking relationship with the identified user account using the mapping.

9. The method of claim 8, wherein the identified user account has a social networking relationship with more than the threshold number of user accounts.

10. The method of claim 8, wherein the documents in the plurality of documents comprise at least one of webpages, images, or videos.

11. The method of claim 8, wherein the user account is a user account in a social networking application.

12. The method of claim 8, wherein the social networking relationship is a friend relationship.

13. The method of claim 8, wherein the index server is one of a plurality of index servers and each index server stores the mapping of only highly-connected user accounts.

14. A system comprising:
a front-end server adapted to:
receive a query, wherein the query is associated with a user account in a social networking application;
determine if the user account is a highly-connected user account;
if the user account is not a highly-connected user account, provide the received query and identifiers of other user accounts that have a social networking relationship with the user account; and
if the user account is a highly-connected user account, provide the received query and only an identifier of the user account; and
an index server adapted to:
receive the provided query and the identifier of the user account;
determine one or more documents endorsed by users associated with other user accounts that have a social networking relationship with the identified user account from a plurality of documents comprising:
retrieving a stored mapping of only highly-connected user accounts to documents that were endorsed by users that are associated with user accounts that have a social networking relationship with the highly-connected user accounts, wherein a user account is a highly-connected user account if it has a social networking relationship with more than a threshold number of other user accounts in the social networking application; and
determining the one or more documents from the plurality of documents endorsed by users associated with user accounts that have a social networking relationship with the identified user account using the mapping;
select one or more documents from the plurality of documents based on the provided query and the determined one or more documents endorsed by users; and
provide identifiers of the selected one or more documents to the front-end server.

15. The system of claim 14, wherein the front-end server is further adapted to:
receive the provided identifiers of the selected one or more documents from the index server;
select a subset of the identified one or more documents; and
provide the subset to a user associated with the received query.

16. The system of claim 14, wherein the index server is one of a plurality of index servers and each index server stores the mapping of only highly-connected user accounts.

* * * * *